US012746489B2

(12) United States Patent
Cunningham

(10) Patent No.: US 12,746,489 B2
(45) Date of Patent: Sep. 29, 2026

(54) SYSTEM, DEVICE, AND METHOD FOR MONITORING CARBON CAPTURE

(71) Applicant: T-MOBILE INNOVATIONS LLC, Overland Park, KS (US)

(72) Inventor: Timothy Edward Cunningham, Dedham, MA (US)

(73) Assignee: T-Mobile Innovations LLC, Overland Park, KS (US)

( * ) Notice: Subject to any disclaimer, the term of this patent is extended or adjusted under 35 U.S.C. 154(b) by 105 days.

(21) Appl. No.: 18/787,214

(22) Filed: Jul. 29, 2024

(65) Prior Publication Data

US 2026/0027498 A1 Jan. 29, 2026

(51) Int. Cl.
*B01D 35/143* (2006.01)

(52) U.S. Cl.
CPC ................................ *B01D 35/1435* (2013.01)

(58) Field of Classification Search
None
See application file for complete search history.

(56) References Cited

U.S. PATENT DOCUMENTS 7,481,917 B2 * 1/2009 Ikeyama ................ B01D 61/10 210/85
9,593,861 B1 * 3/2017 Burnett .................... F24F 11/30
10,646,809 B2 * 5/2020 Arthur .................... G01L 13/00

* cited by examiner

*Primary Examiner* — K. Wong
(74) *Attorney, Agent, or Firm* — Shook, Hardy & Bacon L.L.P.

(57) ABSTRACT

Aspects herein provide systems, devices, methods, and media for monitoring ambient air carbon capture using a device with wireless communication capabilities. Using a wireless network, a carbon capture of a device or system can be monitored.

20 Claims, 6 Drawing Sheets

SYSTEM, DEVICE, AND METHOD FOR MONITORING CARBON CAPTURE

TECHNICAL BACKGROUND

The present disclosure generally relates to systems, methods, and devices involving carbon capture.

SUMMARY

A high-level overview of various aspects of the disclosure is provided here to offer an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In another aspect, one or more non-transitory computer-readable media are provided for storing instructions that when executed via one or more processors perform a computerized method for monitoring ambient air carbon capture devices through wireless communications over a network. When the instructions are executed by one or more processors, input that comprises a current value that corresponds to a carbon capture filter is received. The input corresponds to sensor-captured data in aspects. In aspects, by executing the instructions via the one or more processors, it is determined whether the current value differs from a previously-determined value that corresponds to the carbon capture filter. When the current value is determined to differ from the previously-determined value, a capture score is calculated. The capture score corresponds to the carbon capture filter, and is based on a difference between the current value and the previously-determined value, in various aspects. The indication of the capture score is wirelessly communicated to a user device.

In one aspect, a computerized method is provided for monitoring ambient air carbon capture devices through wireless communications over a network. In aspects, input is received from a wireless communications-enabled device that is communicatively coupled to a sensor in order to monitor the carbon capture filter. The input, in aspects, includes a current value that corresponds to sensor-captured data from monitoring of a carbon capture filter. The current value may be stored in association a timestamp and a unique identifier that corresponds to the wireless communications-enabled device, in some aspects. It may be determined, via a processor, computing device, user device, cloud-based application, or the like, whether the current value differs from a previously-determined value that corresponds to the carbon capture filter. When the current value is determined to differ from the previously-determined value, a capture score that corresponds to the carbon capture filter is calculated. The capture score is based on a difference between the current value and the previously-determined value, in various aspects. The indication of the capture score is wirelessly communicated to a user device. The indication may cause the user device to display a graphical user interface that presents the capture score.

In yet another aspect, a system is provided for monitoring ambient air carbon capture. The system includes a modular housing that forms a cavity. The cavity is shaped to receive and retain a carbon capture filter. The modular housing further includes a coupling device to securely connect the modular housing to an exterior structure, in aspects, in a position that allows airflow through the carbon capture filter when present in the cavity. The system further includes a sensor that monitors the carbon capture filter when present in the cavity, a memory that stores sensor-captured data obtained by the sensor, and a power source, in aspects. The system includes, in various aspects, a transceiver that wirelessly communicates over a network and a controller. The controller is configured to receive the sensor-captured data of the sensor, wherein the sensor-captured data corresponds to a weight or mass of the carbon capture filter. The controlled is further configured to wirelessly communicate an indication of the weight or mass of the carbon capture filter over the network, using the transceiver.

BRIEF DESCRIPTION OF THE DRAWINGS

Aspects are described in detail below with reference to the attached drawings figures, wherein.

DETAILED DESCRIPTION

Figure 1:
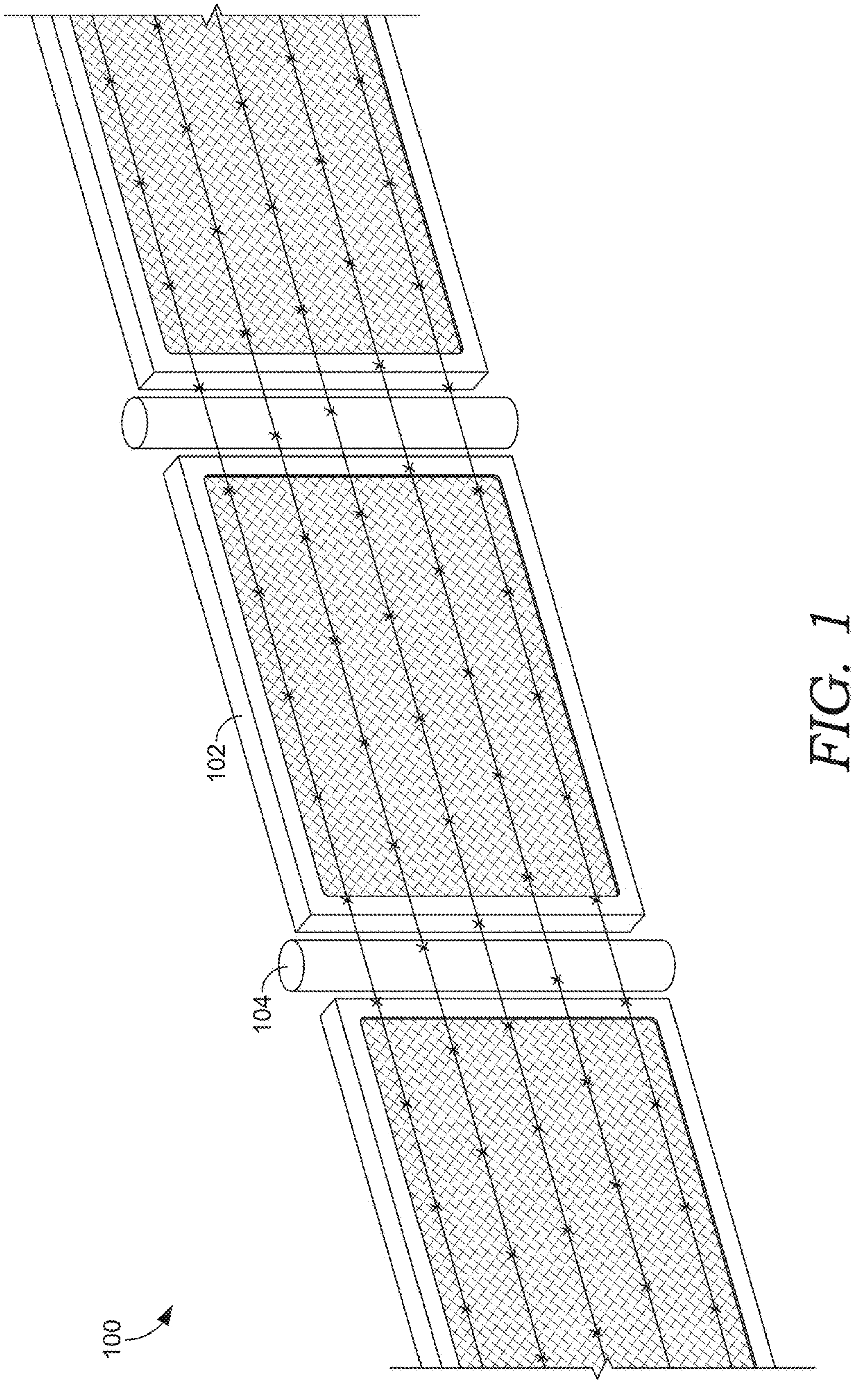
FIG. 1 depicts an example of a system environment, in accordance with one or more aspects.

The subject matter of the present disclosure is being described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of systems and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present disclosure can be embodied in many different forms and should not be construed as limited to the embodiments and aspects set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present disclosure. The following is a list of these acronyms:

3G Third-Generation Wireless Access Technology

4G Fourth-Generation Wireless Access Technology

5G/5G NR Fifth-Generation Wireless Access Technology/New Radio
5GC Fifth-Generation Wireless Access Technology Core Network
AAU Active Antenna Unit
BRS Broadband Radio Service
CD-ROM Compact Disk Read-Only Memory
CDMA Code Division Multiple Access
CU Central Unit
DU Distribution Unit
EIRP Equivalent Isotropically Radiated Power
eNodeB Evolved Node B
EVDO Evolution-Data Optimized
GIS Geographic/Geographical/Geospatial Information System
gNodeB/gNB Next Generation Node B
gNB CU Next Generation Node B Central Unit
gNB DU Next Generation Node B Distribution Unit
GPRS General Packet Radio Service
GSM Global System for Mobile Communication
iDEN Integrated Digital Enhanced Network
DVD Digital Versatile Disc
EEPROM Electrically Erasable Programmable Read-Only Memory
FD-MIMO Full Dimension Multiple-Input Multiple-Output
IOT Internet of Things
IIOT Industry Internet of Things
IP Internet Protocol
LED Light Emitting Diode
LTE Long Term Evolution
MEC Mobile Far Edge Computer
MD Mobile Device
MIMO Multiple-Input Multiple-Output
mMIMO Massive Multiple-Input Multiple-Output
MMU Massive Multiple-Input Multiple-Output Unit
mmWave Millimeter Wave
NEXRAD Next-Generation Radar
NR New Radio
OOBE Out-of-Band-Emission
OTN Optical Transport Network
PC Personal Computer
PCS Personal Communications Service
PDA Personal Digital Assistant
PLMN Public Land Mobile Network
PRB Physical Resource Block
vPRB Virtualized Physical Resource Block
RAN Radio Access Network
RAM Random Access Memory
RET Remote Electrical Tilt
RF Radio-Frequency
RFI Radio-Frequency Interference
RIC Radio Intelligent Controller
RLF Radio Link Failure
R/N Relay Node
RNR Reverse Noise Rise
ROM Read-Only Memory
RRU Remote Radio Unit
RSRP Reference Signal Receive Power
RSRQ Reference Signal Receive Quality
RSSI Received Signal Strength Indicator
RU Radio Unit
SINR Signal-to-Interference-&-Noise Ratio
SNR Signal-to-Noise Ratio
SON Self-Organizing Networks
TDMA Time Division Multiple Access
TXRU Transceiver (or Transceiver Unit)
UE User Equipment
UMTS Universal Mobile Telecommunications System
UTRAN UMTS Radio Access Network
E-UTRAN Evolved Universal Mobile Telecommunications System
WCD Wireless Communication Device (interchangeable with UE)
WLAN Wireless Local Area Network
XR Extended Reality Further, various technical terms are used throughout this description. An illustrative resource that fleshes out various aspects of these terms can be found in *Newton's Telecom Dictionary,* 25th Edition (2009).

Aspects herein may be embodied as, among other things: a method, system, or set of instructions embodied on one or more computer-readable media. Aspects may take the form of a hardware aspect or an aspect combining software and hardware. Some aspects may take the form of a computer program product that includes computer-useable or computer-executable instructions embodied on one or more computer-readable media.

Definitions

"Computer-readable media" can be any available media and may include volatile and non-volatile media, as well as removable and non-removable media. By way of example, and not limitation, computer-readable media may include computer storage media and communication media. Computer-readable media may include both volatile and non-volatile media, removable and non-removable media, and may include media readable by a database, a switch, and various other network devices. Computer-readable media includes media implemented in any way for storing information. Examples of stored information include computer-useable instructions, data structures, program modules, and other data representations.

"Computer storage media" may include, without limitation, volatile and non-volatile media, as well as removable and non-removable media, implemented in any method or technology for the storage of information, such as computer-readable instructions, data structures, program modules, or other data. In this regard, computer storage media may include, but is not limited to, RAM, ROM, Electrically Erasable Programmable Read-Only Memory (EEPROM), flash memory or other memory technology, CD-ROM, DVD, holographic media, other optical disk storage, magnetic cassettes, magnetic tape, magnetic disk storage or other magnetic storage device, or any other medium that can be used to store the desired information and which may be accessed by the device 600 shown in FIG. 600. These technologies can store data momentarily, temporarily, or permanently.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner so as to encode information in the signal. By way of example, and not limitation, communication media includes wired media such as a wired network or direct-wired connection, and wireless media such as acoustic, radio frequency (RF), infrared, and other wireless media. Combinations of any of the above may also be included within the scope of computer-readable media.

The term "application" refers to software, a computer program, and/or an application programming interface that may be run by executing, by a processor, computer-readable instructions stored on memory for running the software. Examples of applications include social media applications, word processing applications, gaming application, messaging applications, video-streaming applications, and more, for example, as run on user devices.

"Network" refers to a network comprised of wireless and wired components that provide wireless communications service coverage, for example, to one or more user devices. For example, the network may include one or more, or a plurality of, wireless networks, hardwired networks, telecommunications networks, peer-to-peer networks, distributed networks, and/or any combination thereof. The network may comprise one or more access points, one or more cell sites (i.e., managed by an access point), one or more structures such as cell towers (i.e., having an antenna) associated with each access point and/or cell site, a gateway, a backhaul data center, a server that connects two or more access points, a database, a power supply, sensors, and other components not discussed herein, in various aspects. Examples of a network include a telecommunications network (e.g., 3G, 4G, 5G, CDMA, CDMA IXA, GPRS, EVDO, TDMA, GSM, LTE, and/or LTE Advanced) and/or a satellite network (e.g., Low Earth Orbit [LEO], Medium Earth Orbit [MEO], or geostationary). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMAX) network, and/or an ad hoc (mesh) network. The network may include or may communicate with a physical location component for determining a geographic location of an item, package, parcel, personnel, vehicle, end-point location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity [SOP]).

"Access point" and "base station" are used interchangeably herein to reference hardware, software, devices, or other components for a communications device or structure having an antenna, an antenna array, a radio, a transceiver, and/or a controller. An access point can be deployed terrestrially at or near the Earth's surface, or within the atmosphere, for example, to orbit the Earth. For example, an "aerospace access point" may be a satellite deployed to orbit the Earth within or above the atmosphere (e.g., in the thermosphere or exosphere), whereas a "terrestrial access point" may be a fixed or semi-fixed base station located on the Earth's surface or upon any structure located on the surface. As discussed herein, an access point is a device comprised of hardware and complex software that is deployed in a network so that the access point can control and facilitate, via one or more antennas or antenna arrays, the broadcast, transmission, synchronization, and receipt of wireless signals in order to communicate with, verify, authenticate, and provide wireless communications service coverage to one or more user devices that request to join and/or are connected to the network. Generally, an access point can communicate directly with one or more user devices according to one or more access technologies (e.g., 3G, 4G, LTE, 5G, and mMIMO). An example of an aerospace access point includes a satellite. Examples of a terrestrial access point include a base station, an eNodeB, a gNodeB, a macrocell, a small cell, a microcell, a femtocell, a picocell, and/or a computing device capable of acting as a wireless "hotspot" that enables connectivity to the network. Accordingly, the scale and coverage area of various types of access points are not limited to the examples discussed. Access points may work alone or in concert with one another, locally or remotely.

"Cell site" is generally used herein to refer to a defined wireless communications coverage area (i.e., a geographic area) serviced by an access point or a plurality of neighboring access points working together to provide a single coverage area. Also, it will be understood that one access point may control one cell site/coverage area, or, alternatively, one access point may control multiple cell sites/coverage areas.

"User equipment" (UE), "user device," "mobile device," and "wireless communication device" are used interchangeably to refer to a device having hardware and software that is employed by a user in order to send and/or receive electronic signals/communication over one or more networks, whether terrestrial or aerospace. User devices generally include one or more antennas coupled to a radio for exchanging (e.g., transmitting and receiving) transmissions with an in-range base station that also has an antenna or antenna array. In aspects, user devices may constitute any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The terms "radio," "controller," "antenna," and "antenna array" are used interchangeably herein to refer to one or more software and hardware components that facilitate sending and receiving wireless radio frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas having a length, for example, of ¼, ½, 1, or 1½ wavelengths. The antennas may be monopole, loop, parabolic, traveling-wave, aperture, Yagi-Uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that sequential or relative terms such as "first," "second," "third," "primary," and/or "secondary" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Overview

Aspects herein provide systems, methods, devices, and media for monitoring ambient air carbon-capture.

FIG. 1 depicts an example of a system environment 100. The system environment 100 is shown to include an example of a carbon capture device 102 that is coupled to an exterior structure, such as a fence 104. In aspects, one or more carbon capturing devices may be coupled to various portions of an exterior structure, in a modular manner. As shown in the example of FIG. 1, a plurality of carbon capturing devices are coupled to various segments of fence, each segment separated by grounding posts. The size, shape, quantity, distribution, arrangement, and configuration of carbon capturing device may vary and/or may be customized to couple to various types of exterior structures, particular climates and/or altitudes, types of location (e.g., remote, rural, suburban, urban) and/or geographic locations. Examples of exterior structures include fences, such as chain-link fences, hinged joint fences, barbed wire fences, woven wire fences, cable wire fences, mesh fences, high-tensile wire fences, post-and-rail fences, picket fences, lattice fences, wrought iron fencings, and other of various materials, constructions, and/or configurations that allow for ambient air to pass through or around them based on construction and/or materials. Examples of exterior structures include railings that are exteriorly located (e.g., balconies or stairways), wind turbines, billboard structures, highway-spanning signage structures, bridges, pedestrian bridges, portable structures that may be transported and deployed at various locations, and more.

Figure 2:
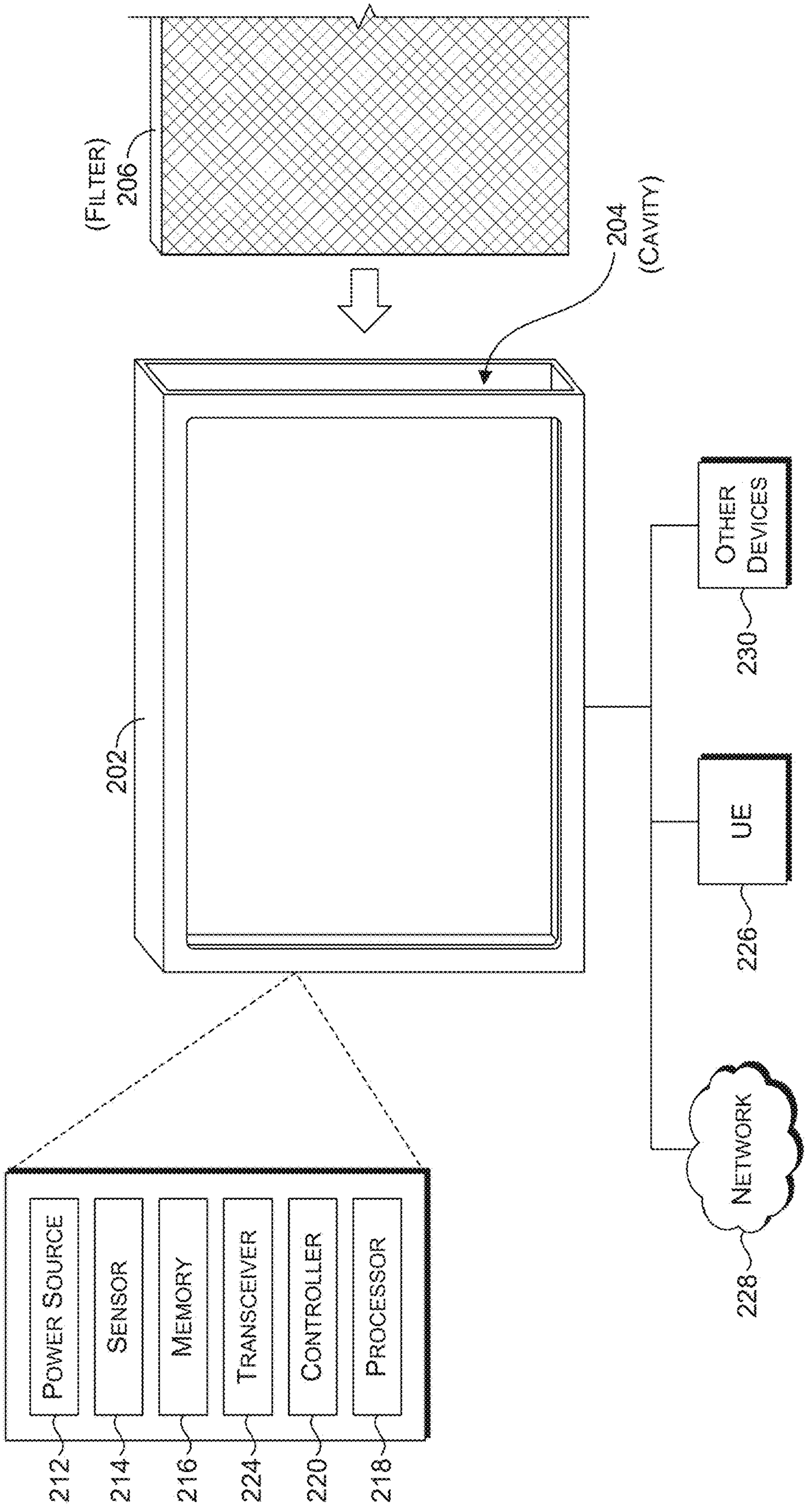
FIG. 2 is a simplified illustration of a modular unit in accordance with one or more aspects.

Looking to FIG. 2, the carbon capture device 102 and components thereof are depicted in accordance with some aspects. The carbon capture device 102 has a modular housing 202. The modular housing 202 may have a shape, dimensions, configuration, and/or arrangement such that the modular housing 202 forms a cavity 204 that is shaped to receive and retain a filter 206 that captures and traps carbon present in ambient air. The modular housing 202 may have a shape, dimensions, configuration, arrangement and/or construction such that the modular housing 202 is rigid enough to retain the filter 206 within the cavity. The modular housing 202 is constructed to have structurally flexibility and resilience such that the modular housing 202 is able to withstand prolonged exposure to outdoor environmental and climate changes (e.g., sunlight, heat waves, extreme cold, high winds, impact, and pollution). In aspects, the filter 206 may be shaped, arranged, configured, and/or otherwise constructed in a manner to increase and/or to maximize surface area contact with ambient air, as positioned in the cavity 204.

The modular housing 202 having a coupling device (note shown) to securely connect the modular housing 202 to an exterior structure in a position that allows airflow through a filter 206 when present in the cavity 204. Examples of a coupling device includes various clamps, ties, adhesives, hooks, apertures configured to receive nails or screws, and the like. As mentioned further herein, one or more sensors may be used to monitor the state of the connection of the coupling device to the exterior structure and/or the modular housing 202. The modular housing 202 may house, protect, and partially or fully enclose various computing software and hardware components, which are depicted in a box diagram for simplicity. Accordingly, the carbon capture device 102 includes a power source 212, also referred to interchangeably as a “power supply.” The power source 212 provides sufficient power continuously, periodically, or on-demand, for example, to one or more of the components in order to monitor carbon capture. Examples of power sources include one or more of solar cells, batteries, AC current, inductive coupling, and/or the like.

The carbon capture device 102 includes a sensor 214 that monitors the carbon capture filter when present in the cavity. The sensor 214 is configured to measure characteristics of the filter 206, such as the mass and/or weight of the filter 206. Additionally, the sensor 214 may be a plurality of sensors that are configured to measure the same characteristics, related characteristics, or different characteristic of the filter 206. For example, the sensor 214 may additionally monitor whether the filter 206 is inserted into the cavity 204 or removed from the cavity 204. In some aspects, the sensor 214 may be a plurality of sensors that are configured to measure the same characteristics, related characteristics, or different characteristic of the carbon capture device 102 and/or various components, such as other sensors, the modular housing 202, the coupling device, and more. For example other sensors may be used to monitor and determine attachment or detachment of the coupling device, to monitor and determine damage to the modular housing 202, to monitor, and to determine a position and/or orientation of the modular housing 202 and the filter 206. Other sensors may be used to measure climate conditions such as temperature, wind speed, precipitation, and more. As such, various sensor types such as optical, motion, proximity, temperature, water or humidity, wind speed, sound, impact, and more, are considered to be within the scope of the aspects described herein. For example, a sensor may measure and/or capture a weight or mass of the carbon capture filter, airflow through the carbon capture filter, an airflow speed, an airflow direction, or the like.

The carbon capture device 102 includes a memory 216. The memory 216 can store any type of data, including data captured by the sensor 214, data corresponding to the filter 206, data corresponding to the carbon capture device 102 itself and/or its components, and identifiers for the filter 206, the carbon capture device 102 itself, and/or its components, for example. The memory 216 can be, for example, physical memory for storing data and computer-readable instructions for execution and implementation via the processor 218, and/or any other components therein. The carbon capture device 102 further includes a transceiver 224 that is capable of sending and receiving wireless communications over a short-range, a medium-range, and/or a long-range network using various protocols and frequencies.

The carbon capture device 102 includes a controller 222 that is specially configured to operate using computer-readable instructions stored in the memory 216. The controller 222 can utilize the instructions to perform actions to monitor the carbon capture device 102 and its components, including the power source 212, the memory 216, the sensor 214, and the transceiver 224, for example. In aspects, the controller 222 receive the sensor-captured data of the sensor 214, which may correspond to a weight or mass of the carbon capture filter. Additionally, the controller 222 receive sensor-captured data from any quantity of various sensors, as previously discussed. Using the transceiver 224, the controller 222 generates and communicates and an indication of the weight or mass of the filter 206 over the network, for receipt by another device, a cloud-based application, or the like. The indication of the weight or mass of the filter 206 can be utilized to monitor and determine carbon capture, as discussed hereinafter.

In some aspects, a plurality of adjacent carbon capture devices operate together to form a monitoring system. In one such aspect, each of the modular housings in the plurality of adjacent carbon capture devices is communicatively coupled to at least one other modular housing in the grouping or set, such that the plurality of adjacent carbon capture devices can be monitored together. In some aspects, one modular housing in the plurality includes a transceiver that wirelessly communicates over a telecommunications network, while that remainder of the plurality of modular housings only wirelessly communicate in a local network, with one another, with the at least one modular housing having the transceiver, or another local device. In other aspects, one or more modular housings in the plurality include a transceiver that wirelessly communicates over a telecommunications network, while a portion (or the remainder) of the plurality of modular housings only wirelessly communicate in a local network, with one another, with at least one modular housing having telecommunications capabilities, or another local device.

In aspects, the controller 220 is further configured to receive a unique identifier of a user of the user device 226, the modular housing 202, the filter 206, or a combination thereof. The unique identifier may be received from a user device (e.g., as user input), a local network, or a component of the device itself, such as an optical sensor that can "read" a machine-readable identifier (e.g., barcode, QR code). In response to receipt, the controller 220 may communicate the unique identifier over a telecommunications network, for example, for receipt by a user device 226, other device(s) 230, and/or a cloud-based application on a network 228 that monitors the carbon capture device 102. In some aspects, the controller 220 may communicate an indication of the weight or mass of the filter 206 along with the unique identifier. As such, the recipient user device, local device, and/or a cloud-based application that monitors the carbon capture device 102 can store the weight or mass of the carbon capture filter in association with the unique identifier.

Having described the system environment 100 and components thereof, it will be understood by those of ordinary skill in the art that the system environment 100 is but one example of a suitable system and is not intended to limit the scope of use or functionality of the present invention. Similarly, the system environment 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing a communication links between the components shown in FIG. 1, may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should be not be interpreted as limiting the present invention to exclude additional components and combination(s) of components. Moreover, though components are represented in FIG. 1 as singular components, it will be appreciated that some embodiments may include a plurality of devices and/or components such that FIG. 1 should not be considered as limiting the number of a device or component.

Figure 3:
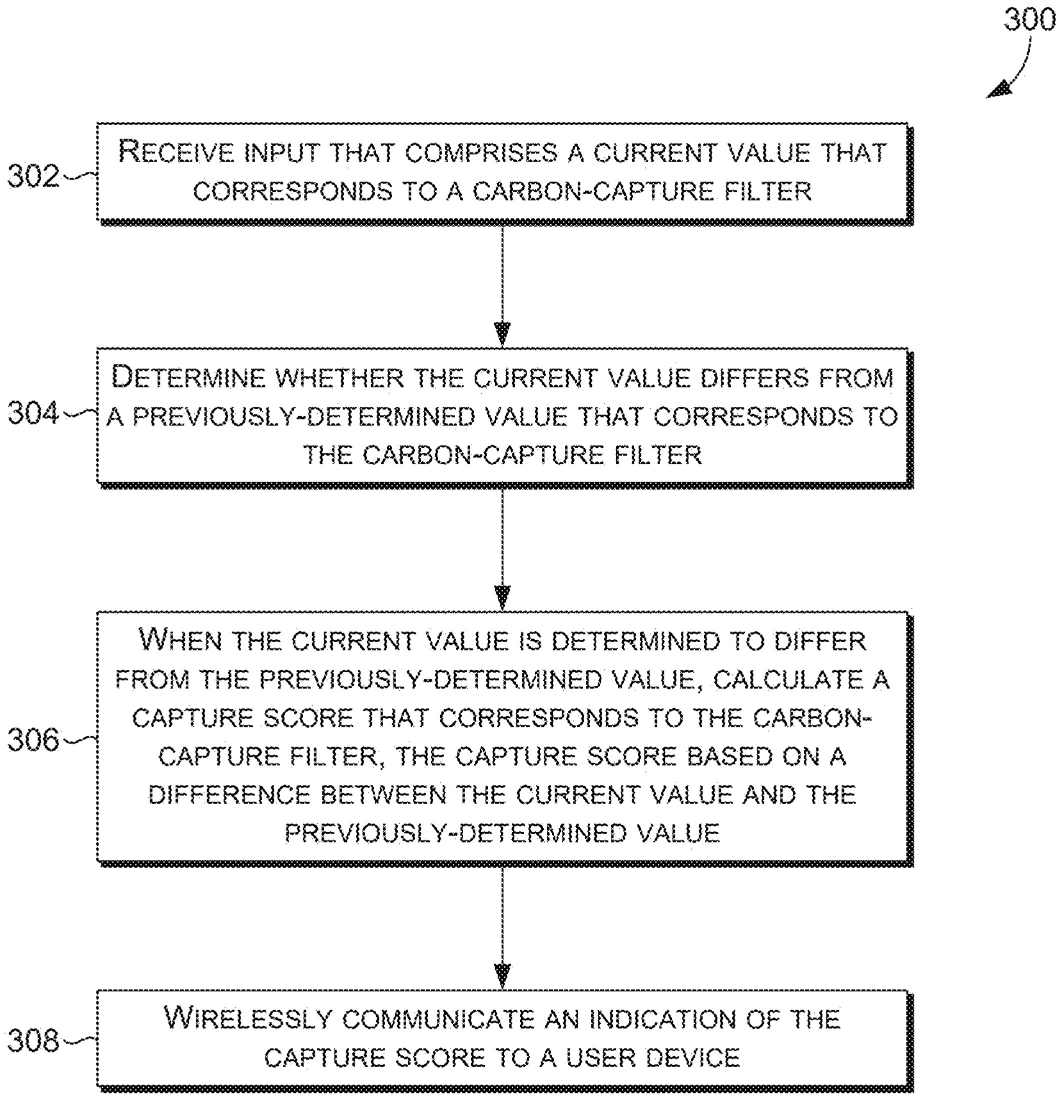
FIG. 3 depicts a flowchart of a method in accordance with one or more aspects.
Figure 4:
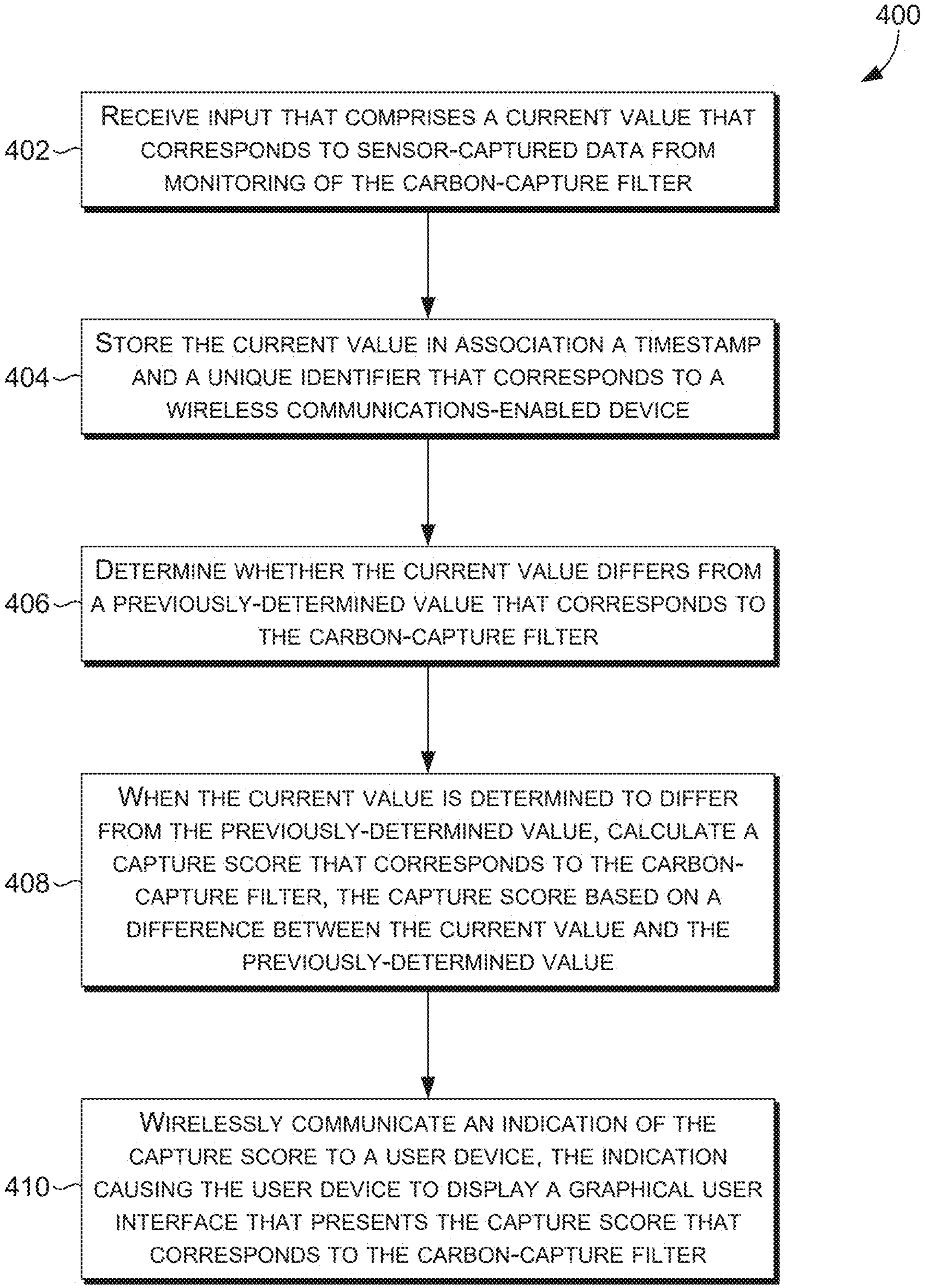
FIG. 4 depicts a flowchart of another method in accordance with one or more aspects.
Figure 5:
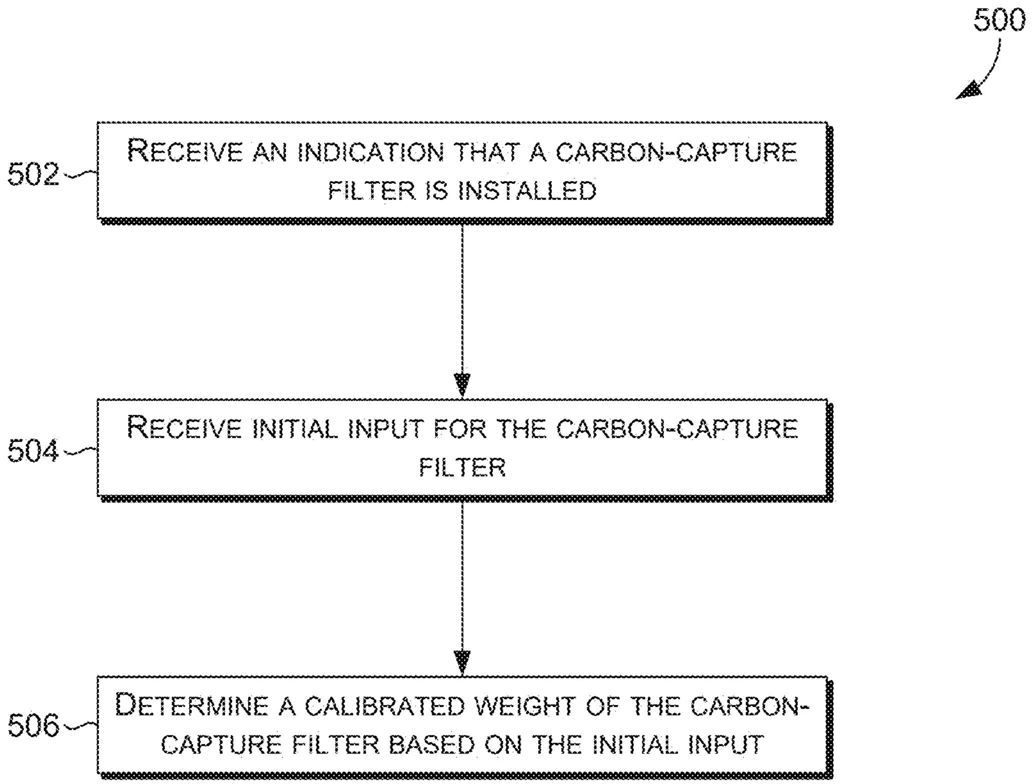
FIG. 5 depicts a flowchart of yet another method in accordance with one or more aspects.

Turning now to FIGS. 3 through 5, methods are discussed that can be performed via one or more of the components and component interactions previously described in FIGS. 1 and 2. As such, the methods are discussed briefly for brevity, though it will be understood that the previous discussion and details described therein can be applicable to aspect of the methods of FIGS. 3 through 5. Additionally or alternatively, it will be understood that the methods discussed herein can be implemented or performed via the execution of computer-readable instructions stored on computer readable media, by one or more processors.

FIG. 3 depicts a flowchart of an example method for monitoring ambient air carbon capture devices using a wireless network, in accordance with one or more aspects. Although discussed with regard to single carbon capture device and/or a single carbon capture filter, it will be understood that the method 300 may be performed simultaneously, sequentially, or concurrently for any quality of carbon capture devices and their corresponding carbon capture filter(s).

At block 302, input that comprises a current value that corresponds to a carbon capture filter is received. The input corresponds to sensor-captured data, such that the current value may represent and/or quantify the sensor-captured data as well as identify the parameter or characteristic that was measured (e.g., weight, mass). For example, a cloud-based application may receive an input of the current value for a particular carbon capture filter (or for a particular set of carbon capture filters) from a particular carbon capture device (or for a particular set of carbon capture devices), as communicated over a wireless network, such as a telecommunications network. In one example, a cloud-based application may receive an input of the current value for each carbon capture filter in a particular set or grouping, from a particular carbon capture device that monitors the grouping or set, as communicated over a wireless network, such as a telecommunications network. Additionally, the input may include a unique identifier for the carbon capture filter, for a carbon capture device that monitors the carbon capture filter, and/or a user associated with the carbon capture filter and/or corresponding carbon capture device. In some aspects, the input may include indications of additional sensor-captured data from other sensors, such as optical, motion, proximity, temperature, water or humidity, wind speed, sound, impact, and others. For example, the input may include sensor-captured data that indicates attachment or detachment of the coupling device, sensor-captured data that indicates damage to the modular housing 202, sensor-captured data that specifies a position and/or orientation of the modular housing 202 and/or the filter 206, sensor-captured data corresponding to climate conditions such as temperature, wind speed, precipitation at the location of the carbon-capture device, sensor-captured data indicating airflow through the carbon capture filter, an airflow speed, an airflow direction, and more.

At block 304, it is determined whether the current value differs from a previously-determined value that corresponds to the carbon capture filter. For example, a cloud-based application may determine whether the current value that corresponds to the sensor-captured data for the carbon capture filter differs from a previously-determined value that corresponds to the same carbon capture filter. The previously-determined value that corresponds to the same carbon capture filter may be referenced from memory or storage using a unique identifier for the carbon capture filter, for a carbon capture device that monitors the carbon capture filter, and/or a user associated with the carbon capture filter and/or corresponding carbon capture device. In some aspects, a cloud-based application may determine whether the current value that corresponds to the sensor-captured data for the carbon capture filter differs from a previously-determined value that corresponds to a similar carbon capture filter or a neighboring carbon capture filter located in close proximity to the carbon filter for which the input was received. Accordingly, historical data for nearby carbon captured devices and/or nearby carbon filters, whether belonging to a particular device/filter grouping or being geographically proximate (e.g., based on a radius, a zip code, a town or city), may be leveraged. In one aspect, a cloud-based application may determine whether the current value that corresponds to the sensor-captured data for the carbon capture filter differs from a previously-determined value that defines a target value, a threshold, a minimum, a maximum, or a range of values. As discussed further herein, indications and values for additional sensor-captured data from other sensors, received as input, may be evaluated in the same or similar manner using historical sensor-based data for the same, similar, or nearby by device(s)/filter(s).

When the current value is determined to differ from the previously-determined value, a capture score is calculated that corresponds to the carbon capture filter, shown at block 306, based on a difference between the current value and the previously-determined value. In aspects, the capture score represents a total quantity or amount of carbon that has been passively captured from ambient air by the carbon capture filter at that point in time. In some aspects, the capture score represents a total quantity or amount of carbon that has been passively captured from ambient air by a plurality of carbon capture filters that are associated with a particular carbon capture device or a plurality of carbon capture devices, as assessed at that point in time. In various aspects, the capture score represents a total quantity or amount of carbon that has been passively captured from ambient air by a plurality of carbon capture filters that are associated with a particular user that is associated with a particular carbon capture device or a plurality of carbon capture devices, as assessed at that point in time. The current value and the capture score, as well as any additional sensor-captured data, unique identifier(s), may be stored in a database for subsequent reference and use in calculating an updated capture score for the filter.

At block 308, an indication of the capture score is wirelessly communicated to a user device. The user device may be associated with a particular carbon capture device/filter or a plurality of carbon capture devices/filters, which include(s) the carbon capture filter for which the current value was received as input. The indication of the capture score may be communicated electronically and wirelessly over a telecommunications network, in the form of a text message, an SMS message, an email, an application-based alert or notification, or similar. The indication may include the capture score alone, or alongside additional information regarding carbon capture of the device(s)/filter(s). Additional information may include for example, historical data for a user associated with one or more carbon capture devices, a total carbon capture amount for a user as aggregated for a plurality of carbon capture devices over a defined period of time (e.g., one day, one week, one month, one year, five years, etc.) independent of filter changes, historical data for other users having a similar geographic location as the user or carbon capture devices, and more. The method 300 may be iteratively and automatically repeated, for example, to make determinations of whether one or more updated current values differ from one or more previously-determined values for various carbon capture filters, for example, for each subsequent instance of input received that corresponds to new sensor-captured data. In this manner, a user may track their total amounts of carbon capture over longer periods of time, even as carbon capture filters are replaced.

In some aspects, the indication of the capture score may be communicated with instructions that cause a graphical user interface to be generated and displayed at the user device. In such an example, the graphical user interface comprises the capture score that corresponds to the corresponds to the carbon capture filter and a notification that is based on the capture score, the notification being an instruction to replace the carbon capture filter with a new carbon capture filter.

In further aspects, additional functionality of a cloud-based application can be provided to enhance the method 300 discussed above. For example, when the sensor-captured data (of the input received) includes a current weight or mass of the carbon capture filter, a cloud-based application may utilize the data to determine a predicted life span of the particular carbon capture filter. The predicted life span comprises a future date when the current weight or mass of the carbon capture filter is predicted to reach a total targeted carbon capture value. For example, based on the current weight or mass of the carbon capture filter, the cloud-based application may determine whether the carbon capture filter is approaching or at least meets a threshold that define a total targeted carbon capture value for the filter. When it is determined that the carbon capture filter meets (or is determine to be approaching, or within a range of) the threshold, the cloud-based application may generate instruction that cause a graphical user interface (or a notification pop-up, text message, etc.) to be generated and displayed at the user device, in such an example. The graphical user interface may present or display, graphically and/or with text, the capture score that corresponds to the carbon capture filter and a notification that is an instruction to replace the carbon capture filter with a new carbon capture filter. In further aspects, based on the current weight or mass of the carbon capture filter, the cloud-based application may determine whether the carbon capture filter is approaching but has not yet met a threshold, or has meet a threshold, that defines defining a total targeted carbon capture value. When determined, the cloud-based application may automatically generate instructions and/or a communication that causes a new carbon capture filter to be auto-purchased and/or auto-shipped to a user's address that is associated with the carbon capture device that monitors the particular carbon capture filter.

In another example, the sensor-captured data (of the input received) may include several parameters or characteristics captured via sensors, such as values for a current weight or mass of the carbon capture filter and a current airflow value. In one such example, based on the current weight or mass of the carbon capture filter, an initial weight or mass of the carbon capture filter, the current airflow value, or any combination thereof, the cloud-based application may determine whether the particular carbon capture filter (or device monitoring one or more carbon capture filters) has met a threshold. In this example, the threshold defines a targeted amount of carbon capture for a defined period of time that has lapsed (e.g., one week, one month, six weeks, three months, one year, etc.). In such an example, the cloud-based application is capable of determining a rate of carbon capture for a particular carbon capture filter (or device monitoring one or more carbon capture filters). Further, based on the rate of capture, the cloud-based application may capable of determine how the particular carbon capture filter (or device monitoring one or more carbon capture filters) relative to historical data of the same particular carbon capture filter (or device monitoring one or more carbon capture filters), or neighboring carbon capture filter(s)/device(s). The current airflow value may be compared to a corresponding threshold or historical data, as indicative of whether sufficient ambient air passes through the carbon capture filter. The airflow value may include atmospheric metrics such as wind speed and wind direction, for example. While the airflow value may be provided as input from a carbon capture device in some aspects, an airflow value may additionally or alternatively retrieved from a web-based data source (e.g., the National Weather Service) or weather-tracking application, using airflow values that are specific to the location of the carbon capture filter(s)/device(s).

In an example, when it is determined that the carbon capture filter has not met or is below the threshold, the cloud-based application may generate instructions that cause a graphical user interface to be generated and displayed at the user device. The graphical user interface may display the capture score that corresponds to the carbon capture filter and a notification, for example. The notification may include an instruction to modify a positioning of the carbon capture filter from the current position to another specific position, wherein the other specific position is associated with a greater likelihood of increased airflow relative to the current position. The other specific position may be selected by the cloud-based application as predicted to improve or increased the amount, volume, or quantity of ambient air that passes through the carbon capture filter for a future time period. As used herein, the "position" may refer to directionality, angle, or orientation relative to a cardinal direction or other physical point of reference, for example. Based on the instruction, the carbon capture filter may be physically adjusted and/or moved to another structure to better align with the selected positioning. Accordingly, the cloud-based application can intelligently optimize and improve the performance of carbon capture device(s) and their corresponding carbon capture filter(s). Such an evaluation may be performed periodically, intermittently, responsive to threshold determinations, and/or on-demand, in various aspects.

In additional aspects, unique identifiers may be leveraged to reference user specific information, filter specific information, filter-type specific information, neighboring filter/device specific information, device specific information, device-type specific information, geographic specific information, or any combination thereof, as retrievable from a data store by the cloud-based application, for example. Examples of unique identifiers include a unique identifier being a geographic location that corresponds to a wireless communications-enabled device that is communicatively coupled to a sensor that provides the sensor-captured data for the carbon capture filter, a user identifier that is associated with the wireless communications-enabled device, a device identifier that corresponds to the wireless communications-enabled device, a filter identifier that corresponds to a carbon capture filter, or any combination thereof. Such information may further be used by the cloud-based application to identify, select, and/or reference particular thresholds that are specific to, for example, a particular filter, a filter type, a particular device, a device type, a particular location, a location type, or any combination thereof, as retrievable from a data store by the cloud-based application, for example.

Accordingly, based on a unique identifier that corresponds to the carbon capture filter, the cloud-based application may reference a previously-determined value that corresponds to the carbon capture filter, in one example. In another example, based on a unique identifier that corresponds to a wireless communications-enabled device that is communicatively coupled to a sensor that provides the sensor-captured data for the carbon capture filter, the cloud-based application may reference a plurality of historical data that is stored in association with the unique identifier. In such an example, the cloud-based application may calculate the capture score that corresponds to the carbon capture filter based on the historical data. In another example, based on a unique identifier that specifies a particular type of the carbon capture filter, the cloud-based application may reference a plurality of historical data that is stored in association with a plurality of other carbon capture filters of the same particular type. In such an example, the cloud-based application may calculate a capture score that corresponds to the carbon capture filter that is at least partially based on the plurality of historical data of the other carbon capture filters.

Continuing to FIG. 4, it depicts a flowchart of an example method for an application or service that monitors ambient air carbon capture devices using a wireless network, in accordance with one or more aspects. At block 402, input is received that comprises a current value that corresponds to sensor-captured data from monitoring of the carbon capture filter. The input is received from a wireless communications-enabled device that is communicatively coupled to a sensor in order to monitor a carbon capture filter. At block 404, the current value is stored in association with a timestamp and a unique identifier that corresponds to the wireless communications-enabled device. At block 406, it is determined whether the current value differs from a previously-determined value that corresponds to the carbon capture filter. When the current value is determined to differ from the previously-determined value, a capture score is calculated that corresponds to the carbon capture filter based on a difference between the current value and the previously-determined value, shown at block 408. At block 410, an indication of the capture score is wirelessly communicated to a user device, wherein the indication causes the user device to display a graphical user interface that presents the capture score that corresponds to the carbon capture filter.

In further aspects, the method 400 may include receiving a unique identifier that is or includes a geographic location which corresponds to a wireless communications-enabled device that is communicatively coupled to a sensor that provides the sensor-captured data for the carbon capture filter, a user identifier that is associated with the wireless communications-enabled device, a device identifier that corresponds to the wireless communications-enabled device, a filter identifier that corresponds to a carbon capture filter, or any combination thereof. Based on the unique identifier, a corresponding threshold is selected that defines a total targeted carbon capture value, in such aspects. The total targeted carbon capture value may be associated with the unique identifier, and stored for reference. A total targeted carbon capture value may be selected as corresponding to, for example, one or more of: a geographic location that corresponds to a wireless communications-enabled device that is communicatively coupled to a sensor that provides the sensor-captured data for the carbon capture filter; a geographic location that corresponds to a user that is associated with the wireless communications-enabled device; a user identifier for a user that is associated with the wireless communications-enabled device; a device identifier that identifies the particular wireless communications-enabled device; a device identifier that corresponds to a particular type of wireless communications-enabled device; a filter identifier that corresponds to a particular type of the carbon capture filter; or any combination thereof.

FIG. 5 depicts a flowchart of an example method for setup or calibration of a device to monitor carbon capture, in accordance with one or more aspects. Prior to receipt of the input from the sensor that is used to determine whether the current value differs from the previously-determined value that corresponds to the carbon capture filter, an indication that the carbon capture filter is installed is received, shown at block 502. At block 504, an initial input for the carbon capture filter is received. In aspects, the initial input may comprise: a predetermined initial weight that correspond to the carbon capture filter; an average, a mean, or a median that is calculated from a plurality of sensor-captured data that corresponds to weights of the carbon capture filter captured over a defined period of time; or a combination thereof. At block 506, a calibrated weight of the carbon capture filter is determined based on the initial input. The current weight of the carbon capture filter is set to the calibrated weight, in some aspects.

Figure 6:
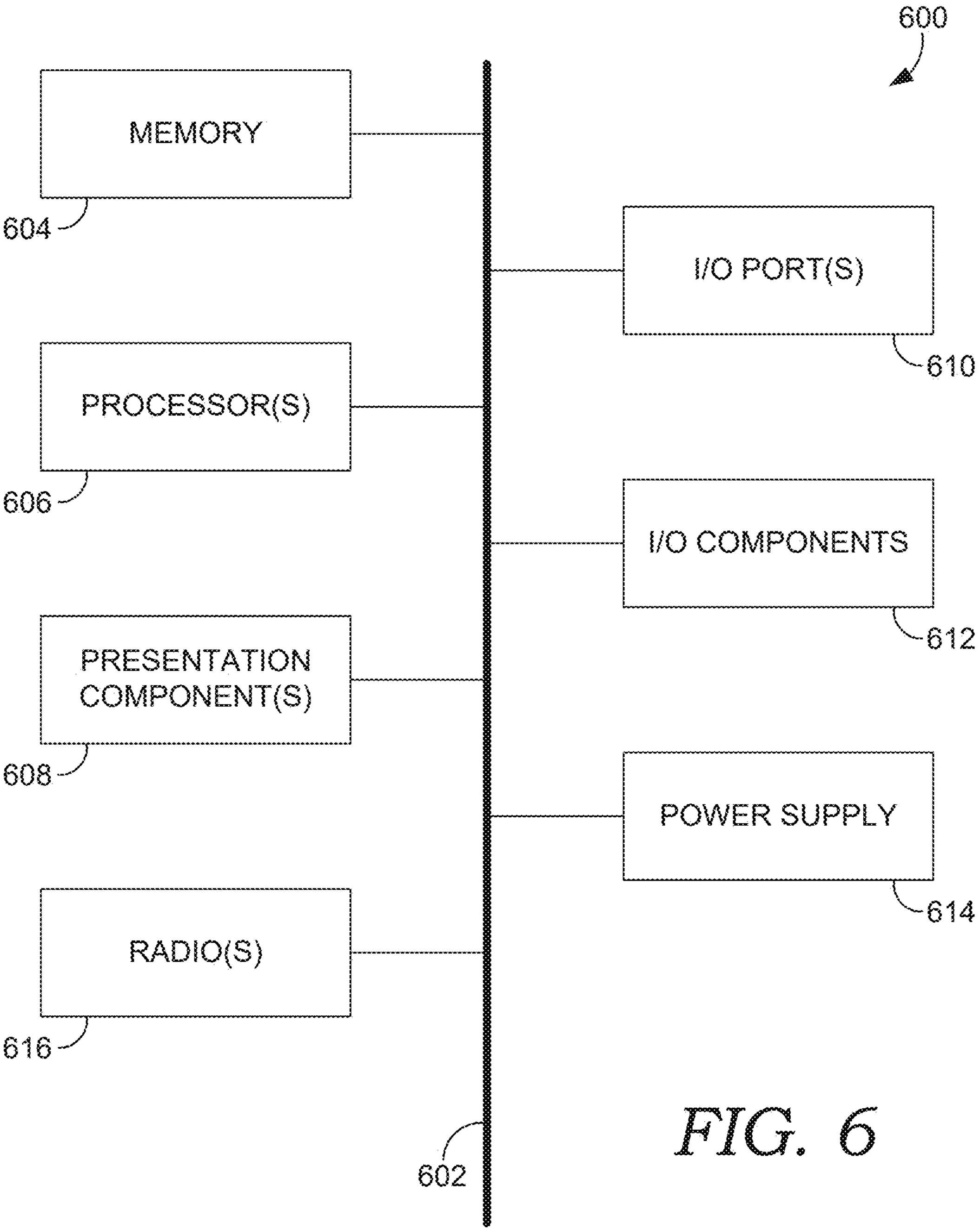
FIG. 6 depicts a simplified block diagram of an example device that is suitable for implementing one or more aspects discussed herein.

Turning to FIG. 6, a diagram of an example device 600 that is suitable for use in implementations of aspects herein is provided. The device 600 is but one example of a suitable computing environment and is not intended to suggest any limitation as to the scope of use or functionality of the disclosure, and nor should the device 600 be interpreted as having any dependency or requirement relating to any one or combination of components illustrated.

The implementations of the present disclosure may be described in the general context of computer code or machine-useable instructions, including computer-executable instructions such as program components being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, the device 600 includes bus 602 that directly or indirectly couples with the following devices: memory 604, one or more processors 606, one or more presentation components 608, input/output (I/O) ports 610, I/O components 612, and power supply 614. Bus 602 represents what may be one or more buses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 612. Also, processors, such as one or more processors 606, have memory. Distinction is not made between such categories as "workstation," "server," "laptop," "handheld device," etc., as all are contemplated within the scope of FIG. 6 and refer to "computer" or "computing device."

The device 600 typically includes a variety of computer-readable media. Computer-readable media can be any available media that can be accessed by the device 600 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, digital versatile disks (DVDs) or other optical disk storage, magnetic cassettes, magnetic tape, and magnetic disk storage or other magnetic storage devices. Computer storage media does not comprise a propagated data signal.

Communication media typically embodies computer-readable instructions, data structures, program modules or other data in a modulated data signal (such as a carrier wave or other transport mechanism), and includes any information delivery media. The term "modulated data signal" indicates a signal that has one or more of its characteristics set or changed in such a manner so as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 604 includes computer storage media in the form of volatile and/or non-volatile memory. Memory 604 may be removable, non-removable, or a combination thereof. Examples of memory include solid-state memory, hard drives, optical disc drives, etc. The device 600 includes one or more processors 606, which read data from various entities such as bus 602, memory 604, or I/O components 612. One or more presentation components 608 present data indications to a person or other device. Examples of one or more presentation components 608 include a display device, speaker, printing component, vibrating component, etc. The I/O ports 610 allow the device 600 to be logically coupled to other devices including I/O components 612, some of which may be built into the device 600. The example I/O components 612 include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, and the like. Radio 616 might additionally or alternatively facilitate other types of wireless communications including Wi-Fi, WiMAX, LTE, or other VOIP communications. As can be appreciated, in various aspects the radio 616 can be configured to support multiple technologies, and/or multiple radios can be utilized to support multiple technologies. A wireless telecommunications network might include an array of devices, which are not shown so as to not obscure more relevant aspects of the disclosure. Components such as a base station, a communications tower, or even access points (as well as other components) can provide wireless connectivity in some aspects.

Regarding FIGS. 1 through 6, it will be understood by those of ordinary skill in the art that the environment(s), system(s), and/or methods(s) depicted are not intended to limit the scope of use or functionality of the present aspects. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated in the figures are contemplated to potentially include methods, hardware, software, and/or other devices for establishing a communications link between the components, devices, systems, and/or entities, as may be utilized in implementation of the present aspects. As such, the absence of component(s) and/or steps(s) from the figures should not be interpreted as limiting the present aspects to exclude additional component(s) and/or combination(s) of components. Moreover, though devices and components in the figures may be represented as singular devices and/or components, it will be appreciated that some aspects can include a plurality of devices and/or components such that the figures should not be considered as limiting the number of a devices and/or components.

Many different arrangements of the various components depicted, as well as components not shown, are possible without departing from the scope of the claims below. Aspects of our technology have been described with the intent of being illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable media storing instructions that when executed via one or more processors perform a computerized method, the instructions stored on the non-transitory computer-readable media comprising:

the one or more processors:

receiving input that comprises a current value that corresponds to a carbon capture filter, the input corresponding to sensor-captured data, wherein the sensor-captured data comprises a current weight or mass of the carbon capture filter that is measured by a sensor;

determining whether the current value differs from a previously-determined value that corresponds to the carbon capture filter;

when the current value is determined to differ from the previously-determined value, calculating a capture score that corresponds to the carbon capture filter, the capture score based on a difference between the current value and the previously-determined value, wherein the capture score represents a quantity or amount of carbon passively captured from ambient air by the carbon capture filter based on a difference between the current weight or mass and a previously-determined calibrated weight or mass; and wirelessly communicating the capture score to a user device.

2. The media of claim 1, wherein determinations of whether one or more current values differ from one or more previously-determined values that correspond to the carbon capture filter are performed automatically for each subsequent instance of input received that corresponds to new sensor-captured data.

3. The media of claim 1, further comprising causing a graphical user interface to be generated and displayed at the user device, wherein the graphical user interface comprises the capture score that corresponds to the corresponds to the carbon capture filter and a notification that is based on the capture score, the notification being an instruction to replace the carbon capture filter with a new carbon capture filter.

4. The media of claim 1, wherein the sensor-captured data further comprises a current airflow value, the media further comprising:

based on the current weight or mass of the carbon capture filter, an initial weight or mass of the carbon capture filter, and the current airflow value, determining whether the carbon capture filter at least meets a threshold, the threshold defining a targeted amount of carbon capture for a defined period of time that has lapsed; and when it is determined that the carbon capture filter is below the threshold, causing a graphical user interface to be generated and displayed at the user device, wherein the graphical user interface comprises the capture score that corresponds to the carbon capture filter and a notification, the notification being an instruction to modify a positioning of the carbon capture filter from a current position to another specific position, wherein the other specific position is associated with a greater likelihood of increased airflow relative to the current position.

5. The media of claim 1, wherein the media further comprising, based on the current weight or mass of the carbon capture filter, determining a predicted life span of the carbon capture filter, wherein the predicted life span comprises a future date when the current weight or mass of the carbon capture filter is predicted to reach a total targeted carbon capture value.

6. The media of claim 1, wherein the media further comprising:

based on the current weight or mass of the carbon capture filter, determining whether the carbon capture filter is approaching or at least meets a threshold, the threshold defining a total targeted carbon capture value; and when it is determined that the carbon capture filter meets the threshold, causing a graphical user interface to be generated and displayed at the user device, wherein the graphical user interface comprises the capture score that corresponds to the carbon capture filter and a notification, the notification being an instruction to replace the carbon capture filter with a new carbon capture filter.

7. The media of claim 1, wherein the media further comprising:

based on the current weight or mass of the carbon capture filter, determining whether the carbon capture filter is approaching or at least meets a threshold, the threshold defining a total targeted carbon capture value; and when it is determined that the carbon capture filter meets the threshold, automatically generating an instruction to cause a new carbon capture filter to be shipped to a user associated with the user device.

8. The media of claim 1, wherein the media further comprising, prior to receipt of the input that is used to determine whether the current value differs from the previously-determined value that corresponds to the carbon capture filter:

receiving an indication that the carbon capture filter is installed;

receiving an initial input for the carbon capture filter, wherein the initial input comprises:

a predetermined initial weight that correspond to the carbon capture filter;

an average, a mean, or a median that is calculated from a plurality of sensor-captured data that corresponds to weights of the carbon capture filter captured over a defined period of time; or a combination thereof; and determining a calibrated weight of the carbon capture filter based on the initial input, wherein a current weight of the carbon capture filter is set to the calibrated weight.

9. The media of claim 1, wherein the capture score represents a total quantity or amount of carbon that has been passively captured from ambient air by the carbon capture filter at that point in time.

10. The media of claim 1, further comprising:

receiving a unique identifier, the unique identifier being a geographic location that corresponds to a wireless communications-enabled device that is communicatively coupled to a sensor that provides the sensor-captured data for the carbon capture filter, a user identifier that is associated with the wireless communications-enabled device, a device identifier that corresponds to the wireless communications-enabled device, a filter identifier that corresponds to the carbon capture filter, or any combination thereof; and based on the unique identifier, referencing the previously-determined value that corresponds to the carbon capture filter.

11. The media of claim 1 further comprising:

receiving a unique identifier that corresponds to a wireless communications-enabled device that is communicatively coupled to a sensor that provides the sensor-captured data for the carbon capture filter; and referencing a plurality of historical data that is stored in association with the unique identifier, wherein calculating the capture score that corresponds to the carbon capture filter is further based on the plurality of historical data.

12. The media of claim 1, further comprising:

receiving a unique identifier specifies a particular type of the carbon capture filter; and referencing a plurality of historical data that is stored in association with a plurality of other carbon capture filters of the particular type, wherein calculating the capture score that corresponds to the carbon capture filter is further based on the plurality of historical data.

13. A computerized method comprising:

receiving, from a wireless communications-enabled device that is communicatively coupled to a sensor in order to monitor a carbon capture filter, input that comprises a current value that corresponds to sensor-captured data from monitoring of the carbon capture filter, wherein the sensor-captured data comprises a current weight or mass of the carbon capture filter that is measured by a sensor;

storing the current value in association a timestamp and a unique identifier that corresponds to the wireless communications-enabled device;

determining whether the current value differs from a previously-determined value that corresponds to the carbon capture filter;

when the current value is determined to differ from the previously-determined value, calculating a capture score that corresponds to the carbon capture filter, the capture score based on a difference between the current value and the previously-determined value, wherein the capture score represents a quantity or amount of carbon passively captured from ambient air by the carbon capture filter based on a difference between the current weight or mass and a previously-determined calibrated weight or mass; and wirelessly communicating the capture score to a user device and instructing the user device to display a graphical user interface that presents the capture score that corresponds to the carbon capture filter.

14. The method of claim 13, further comprising:

receiving the unique identifier, the unique identifier being a geographic location that corresponds to the wireless communications-enabled device that is communicatively coupled to the sensor that provides the sensor-captured data for the carbon capture filter, a user identifier that is associated with the wireless communications-enabled device, a device identifier that corresponds to the wireless communications-enabled device, a filter identifier that corresponds to the carbon capture filter, or any combination thereof;

based on the unique identifier, selecting a corresponding threshold defining a total targeted carbon capture value; and associating the total targeted carbon capture value with the unique identifier.

15. The method of claim 14, wherein the total targeted carbon capture value is selected as corresponding to:

a geographic location that corresponds to the wireless communications-enabled device that is communicatively coupled to the sensor that provides the sensor-captured data for the carbon capture filter;

a geographic location that corresponds to a user that is associated with the wireless communications-enabled device;

a user identifier for the user that is associated with the wireless communications-enabled device;

a device identifier that identifies the particular wireless communications-enabled device;

a device identifier that corresponds to a particular type of wireless communications-enabled device;

a filter identifier that corresponds to a particular type of carbon capture filter; or any combination thereof.

16. A system comprising:

a modular housing, the modular housing forming a cavity that is shaped to receive and retain a carbon capture filter, the modular housing having a coupling device to securely connect the modular housing to an exterior structure in a position that allows airflow through the carbon capture filter when present in the cavity;

a power source;

a sensor that monitors the carbon capture filter when present in the cavity, wherein the sensor includes a weight sensor that measures a weight or mass of the carbon capture filter;

a memory that stores sensor-captured data obtained by the sensor;

a transceiver that wirelessly communicates over a network; and a controller configured to:

receive the sensor-captured data of the sensor, the sensor-captured data including the weight or mass of the carbon capture filter; and wirelessly communicate the weight or mass of the carbon capture filter over the network;

determine an amount of carbon captured by the carbon capture filter based on a difference between (i) a calibrated initial weight or mass of the carbon capture filter and (ii) the weight or mass of the carbon capture filter indicated by the sensor-captured data; and wirelessly communicate the amount of carbon captured or a capture score corresponding to the amount of carbon captured.

17. The system of claim 16, wherein the system comprises a plurality of modular housings, wherein each of the modular housings is communicatively coupled to at least one other modular housing.

18. The system of claim 17, wherein at least one modular housing of the plurality of modular housings includes the transceiver that wirelessly communicates over a telecommunications network, and wherein a remainder of the plurality of modular housings wirelessly communicates with the at least one modular housing using short-range transmissions.

19. The system of claim 16, wherein the controller is further configured to:

receive a unique identifier of a user of a user device, the modular housing, the carbon capture filter, or a combination thereof, and communicate the unique identifier of the user of the user device, the modular housing, the carbon capture filter, or a combination thereof over the network that is a telecommunications network, wherein when wirelessly communicating the weight or mass of the carbon capture filter, including the unique identifier.

20. The system of claim 16, wherein the sensor comprises a plurality of sensors, the plurality of sensors being configured to measure one or more of the weight or mass of the carbon capture filter, airflow through the carbon capture filter, an airflow speed, an airflow direction, or any combination thereof.

* * * * *